United States Patent
Slattery

(10) Patent No.: US 7,347,351 B2
(45) Date of Patent: Mar. 25, 2008

(54) APPARATUS AND SYSTEM FOR UNITIZED FRICTION STIR WELDED STRUCTURES AND ASSOCIATED METHOD

(75) Inventor: Kevin T. Slattery, St. Charles, MO (US)

(73) Assignee: The Boeing Company, Chicago, IL (US)

( * ) Notice: Subject to any disclaimer, the term of this patent is extended or adjusted under 35 U.S.C. 154(b) by 297 days.

(21) Appl. No.: 10/920,620

(22) Filed: Aug. 18, 2004

(65) Prior Publication Data
US 2006/0037992 A1 Feb. 23, 2006

(51) Int. Cl.
*B23K 20/12* (2006.01)
*B23K 37/04* (2006.01)

(52) U.S. Cl. ..................... 228/112.1; 228/2.1

(58) Field of Classification Search ............. None
See application file for complete search history.

(56) References Cited

U.S. PATENT DOCUMENTS

| | | | |
|---|---|---|---|
| 6,321,975 B1 * | 11/2001 | Kawasaki et al. | 228/112.1 |
| 6,367,681 B1 * | 4/2002 | Waldron et al. | 228/112.1 |
| 6,527,470 B2 * | 3/2003 | Ezumi et al. | 403/270 |
| 6,530,513 B2 * | 3/2003 | Ezumi et al. | 228/112.1 |
| 6,676,008 B1 * | 1/2004 | Trapp et al. | 228/112.1 |
| 2001/0052561 A1 * | 12/2001 | Wollaston et al. | 244/132 |
| 2002/0142183 A1 * | 10/2002 | Colligan | 428/593 |
| 2003/0116609 A1 | 6/2003 | Dracup et al. | |
| 2003/0192941 A1 * | 10/2003 | Ishida et al. | 228/112.1 |
| 2004/0057782 A1 * | 3/2004 | Okamoto et al. | 403/271 |
| 2004/0155487 A1 * | 8/2004 | Joaquin et al. | 296/204 |
| 2005/0279810 A1 * | 12/2005 | Stol et al. | 228/112.1 |
| 2006/0027630 A1 * | 2/2006 | Talwar et al. | 228/112.1 |

* cited by examiner

*Primary Examiner*—Kiley Stoner
(74) *Attorney, Agent, or Firm*—Alston & Bird LLP

(57) ABSTRACT

An assembly for positioning a structural assembly for friction stir welding, and a system and method for friction stir welding the structural assembly are provided. The assembly includes an engaging structure and at least one tooling block capable of engaging the engaging structure, as well as a substructure positioned adjacent to the engaging structure and tooling block. The substructure and engaging structure capable of being friction stir welded together to form a butt joint therebetween.

12 Claims, 3 Drawing Sheets

Figure 1:
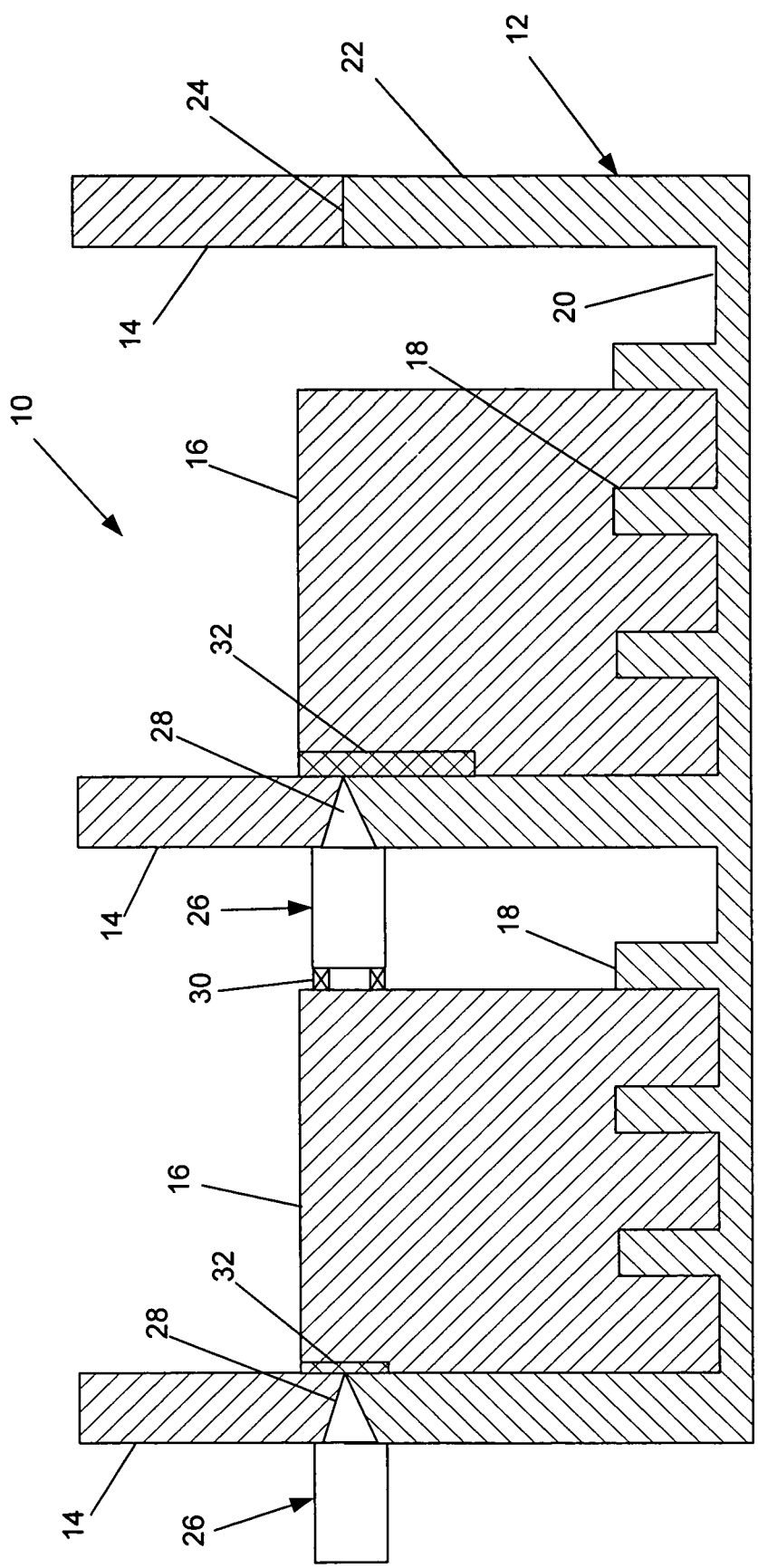

APPARATUS AND SYSTEM FOR UNITIZED FRICTION STIR WELDED STRUCTURES AND ASSOCIATED METHOD

BACKGROUND OF THE INVENTION

1) Field of the Invention

The present invention relates to friction stir welding and, more particularly, to positioning a structural assembly for friction stir welding, and friction stir welding the structural assembly to form a unitized friction stir welded structure.

2) Description of Related Art

Friction stir welding is a process in which a rotating tool, such as a pin or probe, is urged into and/or through a workpiece, e.g., to join multiple members of the workpiece in a solid state or to repair cracks in a workpiece. Typically, the pin extends from a shoulder, which can be flat, concave, or otherwise contoured, and the shoulder is urged against the workpiece so that the pin is urged therein. The pin is then urged through the workpiece to form a continuous weld joint. For example, during one conventional friction stir welding process, the probe of the rotating tool is plunged into a workpiece or between two workpieces by a friction stir welding machine to produce the required resistance force to generate sufficient frictional heating to form a region of plasticized material. The tool can be tilted approximately 3° relative to the workpiece such that the trailing edge of the shoulder is thrust into and consolidates the plasticized material. Upon solidification of the plasticized material, the members of the workpiece are joined along the weld joint. The magnitude of force exerted by the friction stir welding tool must be maintained above a prescribed minimum in order to generate the required frictional heating. Friction stir welding is further described in U.S. Pat. No. 5,460,317 to Thomas et al., the contents of which are incorporated herein by reference.

Friction stir welding has been demonstrated to be a successful joining method for forming certain types of joints, such as the butt joint where the probe is inserted within abutting edges of two structural members, or a lap joint in which the probe is inserted in a direction substantially perpendicular to the interface between overlapping structural members. In addition, other types of friction welding have also been shown to be useful for forming certain joints.

Common aircraft wing structure includes upper and lower wing skins with hundreds or thousands of moldline fasteners joining the two. Reduction or elimination of these fasteners is desirable for cost reduction (fewer fasteners equates to less cost to drill holes and install fasteners), surface finish (a smooth surface provides fewer reflecting surfaces), and durability (fewer fasteners reduces crack initiation sites and fuel leak paths). One way to reduce the number of fasteners in structures with metallic skins and substructure is to friction stir weld the skin to the spars and ribs from the outer moldline. A lap joint is typically formed between the skin and spars and/or ribs, which produces several drawbacks. For example, lap joints contain high natural stress concentrations, and may trap moisture, which may lead to crevice corrosion problems. Because of their location and geometry, lap joints typically see high tension and peel stresses. Forming lap joints also requires that the substructure resist the forces applied during friction stir welding, which can require the substructure to be stiffer than actually needed for service loads, leading to excess weight. Finally, lap joints can leave a rough surface behind that is undesirable from a surface finish standpoint.

It would therefore be advantageous to provide an apparatus and system for friction stir welding a structural assembly that is relatively inexpensive and effective. It would also be advantageous to provide a structural assembly with a reduced number of fasteners and a desirable surface finish. It would further be advantageous to provide an assembly that promotes efficient friction stir welding of the structural assembly.

BRIEF SUMMARY OF THE INVENTION

The invention addresses the above needs and achieves other advantages by providing an assembly for friction stir welding a substructure to an engaging structure, as well as an associated system and method for friction stir welding the substructure and engaging structure. The assembly is capable of being arranged in a variety of configurations to secure the substructure and engaging structure during friction stir welding to create a butt joint therebetween, and is also capable of promoting efficient assembly for friction stir welding.

In one embodiment of the present invention an assembly for positioning a structural assembly for friction stir welding is provided. The assembly includes an engaging structure and at least one tooling block capable of engaging the engaging structure, as well as a substructure positioned adjacent to the engaging structure and tooling block. The substructure and engaging structure are capable of being friction stir welded together. The assembly may additionally include a shim positioned between the tooling block and both the engaging structure and substructure.

In various embodiments of the present invention, the engaging structure includes a base member and a plurality of reinforcement members (e.g., stiffeners) extending outwardly from the base member (e.g., wing skin), and may further include a plurality of attachment members (e.g., rib stubs) extending from the base member. The attachment members may have a greater length than the reinforcement members. The tooling block may be configured to engage the plurality of reinforcement members and to abut at least one attachment member.

In further aspects of the present invention, the engaging structure and substructure are a metallic material. Alternatively, the engaging structure could be a composite material and have a metallic bonding strip bonded to that portion of the engaging structure formed of the composite material such that the bonding strip and substructure are capable of being friction stir welded together. Similarly, the engaging structure and substructure could each be a composite material and include a metallic bonding strip bonded to that portion of the engaging structure formed of the composite material such that respective bonding strips are capable of being friction stir welded together.

In an additional embodiment of the present invention, a system for friction stir welding is provided. The system includes an assembly as described above, as well as a probe operable to friction stir weld the engaging structure and substructure together along at least one interface defined therebetween. Shear clips or plug welds could also be attached proximate to the interface between the engaging structure and substructure.

In various aspects of the system, a shim is positioned between the tooling block and both the engaging structure and substructure, and the probe is capable of extending along the interface between the engaging structure and substructure and proximate to the shim such that the probe extends substantially along the interface. The probe may be a 90-degree friction stir welding probe, wherein the tooling block is capable of supporting the 90-degree probe during friction stir welding. The system may further include a bearing coupled to a first end of the 90-degree probe and positioned adjacent to the tooling block, wherein a second end of the 90-degree probe comprises a pin extending proximate to an interface between the engaging structure and substructure.

The present invention also provides a method for friction stir welding. The method includes positioning at least one tooling block to engage an engaging structure, as well as positioning a substructure adjacent to the engaging structure and tooling block in an abutting configuration to define at least one interface between the substructure and engaging structure. The method also includes urging a probe along the interface to friction stir weld the engaging structure and substructure together along the interface.

In additional aspects of the method, the method includes positioning the tooling block between a plurality of stiffeners and at least one rib stub defined by the engaging structure. The method may also include positioning a shim between the tooling block and both the engaging structure and substructure, and then urging the probe along the interface between the engaging structure and substructure and proximate to the shim such that the probe extends substantially along the interface. The probe may be urged within a bonding strip bonded to at least a portion of the engaging structure such that the probe friction stir welds the bonding strip to the substructure along the interface. Similarly, the probe may be urged within respective bonding strips bonded to at least a portion of the engaging structure and substructure such that the probe friction stir welds the bonding strips together along the interface. The method may include urging a 90-degree probe along an interface, wherein the tooling block is capable of supporting the 90-degree probe during friction stir welding. The method may further include positioning a bearing coupled to a first end of the 90-degree probe adjacent to the tooling block, wherein a second end of the 90-degree probe having a pin thereon is urged along an interface between the engaging structure and substructure.

The present invention therefore provides a structural assembly that is capable of being formed into a unitized friction stir welded assembly that significantly reduces the number of fasteners required to join an engaging structure to a substructure. As such, the structural assembly reduces the potential for fuel leaks and crack initiation sites. When compared to a lap joint, the butt joint formed between the engaging structure and substructure has an improved surface finish and a lesser chance of developing stress concentrations by trapping moisture. In addition, the butt joint, when used within a wing structure, primarily experiences shear stresses, as opposed to tension or peeling stresses experienced by lap joints.

The tooling blocks employed with the present invention are adaptable for a variety of engaging structures and substructures to resist forces produced during friction stir welding. Moreover, the tooling blocks may be arranged within the engaging structure such that a probe having a 90-degree probe may be used to friction stir weld the butt joint. Thus, the structural assembly enables the probe to form a butt joint between an engaging structure and substructure that would typically be difficult to accomplish, especially in circumstances where the attachment members are located internally within the engaging structure. In addition, when lightweight composite materials are desired, the bonding strips may be embedded in the composite material to facilitate friction stir welding.

BRIEF DESCRIPTION OF THE SEVERAL VIEWS OF THE DRAWING(S)

Figure 2:
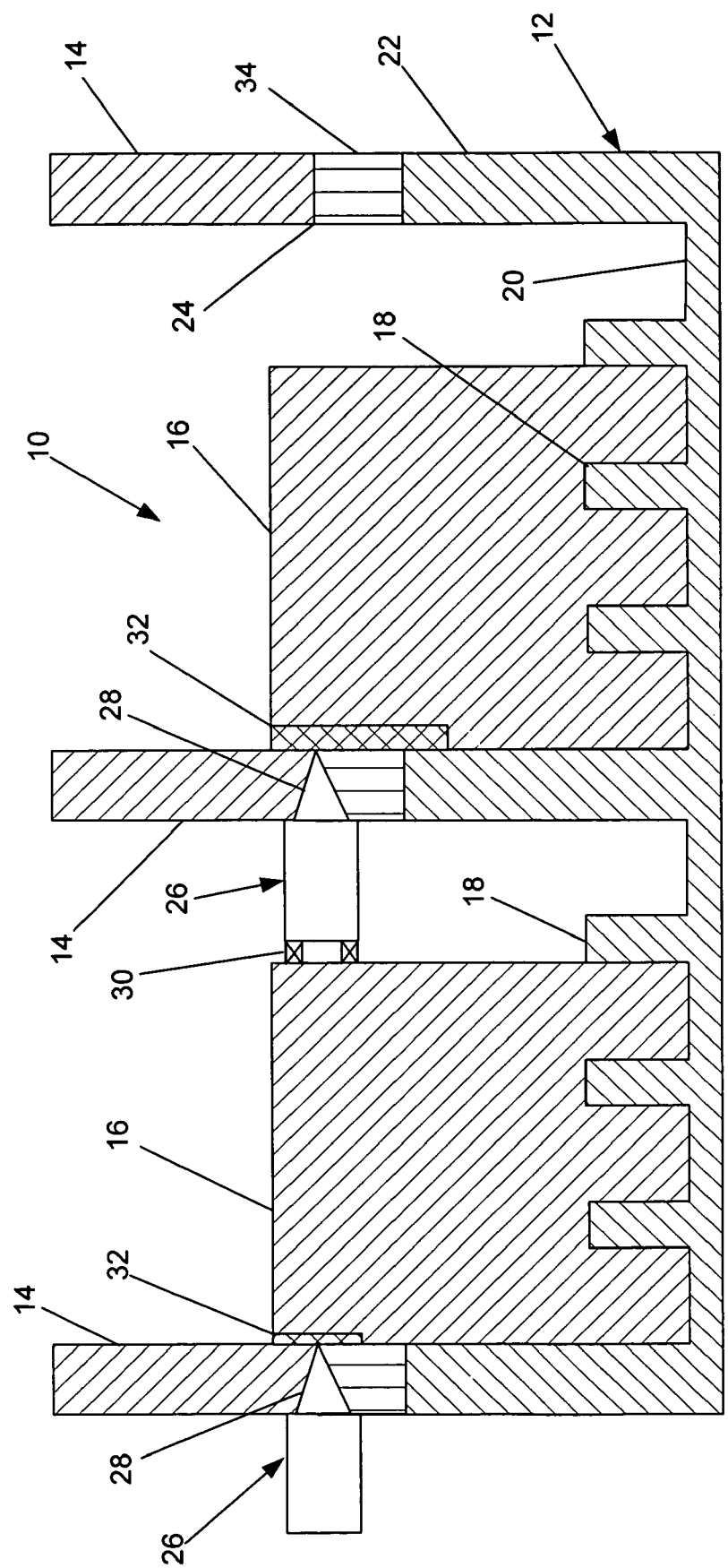
Figure 3:
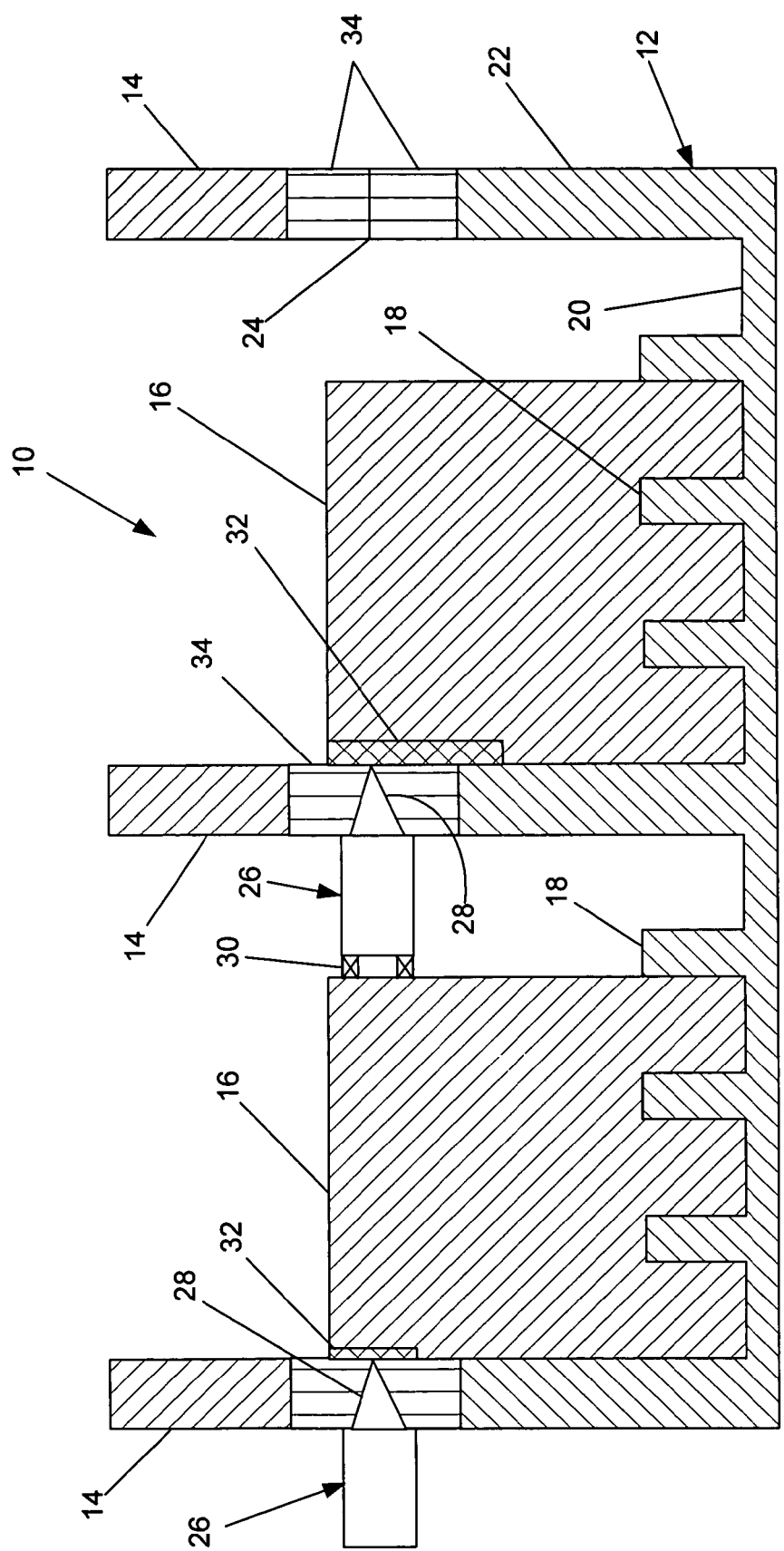

Having thus described the invention in general terms, reference will now be made to the accompanying drawings, which are not necessarily drawn to scale, and wherein:

FIG. 1 is a cross-sectional view of an assembly for positioning a structural assembly for friction stir welding a substructure to an engaging structure according to one embodiment of the present invention;

FIG. 2 is another cross-sectional view of an assembly for positioning a structural assembly for friction stir welding a substructure to an engaging structure illustrating a bonding strip bonded in a composite engaging structure, according to one embodiment of the present invention; and FIG. 3 is yet another cross-sectional view of an assembly for positioning a structural assembly for friction stir welding a substructure to an engaging structure illustrating a bonding strip bonded in a respective composite engaging structure and substructure according to one embodiment of the present invention.

DETAILED DESCRIPTION OF THE INVENTION

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

Referring now to the drawings and, in particular to FIG. 1 there is shown a structural assembly 10 that is capable of being friction stir welded into a unitized friction stir welded structure. The structural assembly 10 includes an engaging structure 12 and substructure 14 arranged to be friction stir welded together. A tooling block 16 is positioned to engage the engaging structure 12 and to support the engaging structure and substructure 14 during friction stir welding such that a butt joint may be formed therebetween. As used herein, the term "structural assembly" is not meant to be limiting, as there could be any number and configuration of engaging structures 12 and substructures 14 joined by friction stir welding. Thus, the structural assembly is useful for the aircraft, automotive, marine, and manufacturing industries where a reduced number of fasteners and potential defects are desired, as well as an improved surface finish.

The engaging structure 12 includes a plurality of reinforcing members 18 and attachment members 22 arranged on and extending outwardly from a base member 20. The reinforcing members 18 could be integral or attached to the base member 20 to provide reinforcement to the base member, and may be spaced apart, such as in six inch increments in one embodiment of the present invention. The reinforcing members 18 may be equally spaced as shown or may be spaced apart by different amounts if desired. Likewise, the reinforcing members 18 may all have the same length as shown in FIG. 1 or may have different lengths. The reinforcing members 18 and attachment members 22 are typically parallel to one another, while the attachment members are slightly longer than the reinforcing members. By extending beyond the reinforcing members 18, the attachment members 22 provide a sufficient amount of space beyond the reinforcing members such that the substructure is capable of being friction stir welded to the attachment members. For example, the attachment members 22 may extend approximately one inch above the reinforcing members 18 in one embodiment of the present invention, where the reinforcing members extend about 1 inch above the base member 20 and the attachment members extend about 2 inches above the base member. In one embodiment, the attachment members 22 typically extend at least a distance approximately equaling the width of a probe 26 beyond the reinforcing members 18 to allow for access of the probe to friction stir weld the attachment members and the substructure 14. The substructure 14 may be any structure capable of being friction stir welded to the engaging structure 12 along a butt joint, and thus, may take many different sizes and configurations.

In one embodiment, the reinforcing members 18 are stiffeners or stringers, as known to those skilled in the art, and are integral with the base member 20, which could be a wing skin. Further, the attachment members 22 could be rib stubs having length greater than the stiffeners. Thus, the engaging structure 12 could be an assembly for an aircraft, and the substructure 14 could be a spar or rib friction stir welded to the rib stubs extending from the wing skin.

The engaging structure 12 and substructure 14 can be formed of a variety of materials including, but not limited to, aluminum, aluminum alloys, titanium, titanium alloys, steel, and the like. Further, the structural assembly 10 can include an engaging structure 12 and substructure 14 of similar or dissimilar materials. For example, the engaging structure 12 and substructure 14 may be formed of different alloys of a base metal, including alloys that are unweldable or uneconomical to join by conventional fusion welding techniques. Unweldable materials, when joined by conventional fusion welding techniques, produce relatively weak weld joints that tend to crack during weld solidification. Such materials include aluminum and some aluminum alloys, particularly AA series 2000 and 7000 alloys. The use of friction stir welding permits the engaging structures 12 and substructures 14 formed of unweldable materials to be securely joined. Friction stir welding also can be used to securely join weldable materials to other weldable and to unweldable materials. Thus, the materials that form the structural assembly 10 can be chosen from a wider variety of lightweight, high strength metals and alloys, thereby facilitating reduction of the overall weight of the structural assembly 10 and a finished part formed therefrom.

Furthermore, one or both of the attachment members 22 and substructures 14 may include a bonding strip 34 bonded or otherwise attached to a composite material, as shown in FIGS. 2-3. The bonding strip 34 is bonded to a portion of the attachment members 22 and/or the substructure 14 proximate to the location of friction stir welding. Thus, the attachment members 22 and/or the substructure 14 may be formed of material that is typically not capable of being friction stir welded, but by using the bonding strip 34 made of friction stir weldable material, the attachment members and substructure can be joined. Each of the attachment members 22 may be a composite material, such as carbon/epoxy, and a respective bonding strip 34 could be a metallic material, such as those described above. The bonding strips 34 maybe bonded to the attachment members 22 and/or the substructure 14 using a variety of techniques known to those skilled in the art, such as co-bonding, secondary bonding, or even mechanical fasteners. FIG. 2 illustrates that bonding strips 34 of the attachment members 22 may be friction stir welded to a metallic substructure 14 to form a butt joint therebetween. Therefore, the engaging structure 12 may be a lightweight material that could not typically be friction stir welded but by including the bonding strips 34, the engaging structure is still capable of being friction stir welded to the substructure 14. In an additional embodiment of the present invention shown in FIG. 3, bonding strips 34 may be bonded to both the engaging structure 12 and substructure 14. As such, the engaging structure 12 and substructure 14 may both be formed of a lightweight composite material and be attached with metallic bonding strips 34 with friction stir welding.

Although FIGS. 1-3 illustrate that the engaging structure 12 includes three attachment members 22 and six reinforcing members 18 spaced therebetween, it is understood that the engaging structure may include any number, size, or configuration of attachment and reinforcing members in alternative embodiments of the present invention. For example, the reinforcing members 18 may be longer than the attachment members 22 by various lengths as long as sufficient space remains for the substructure 14 to be friction stir welded to the attachment members along a butt joint. Further, the attachment members 22 and reinforcing members 18 are not required to be parallel to one another, and there may be instances where the reinforcing members are not utilized. In addition, the bonding strips 34 may be different sizes and configurations, such that the bonding strips could be bonded to a portion of the attachment members 22 or substructure 12 or along the entire length of each, respectfully. The bonding strips 34 could be attached exteriorly (e.g., circumferentially or lengthwise) to the attachment members 22 and/or substructure 14, bonded completely through the cross section of each, or bonded through only a portion of the cross section of each, respectfully.

The tooling blocks 16 engage one or more of the reinforcing members 18 and abut an attachment member 22 to provide support during friction stir welding. In particular, the tooling blocks 16 are capable of being fabricated to engage the reinforcing members 18 such that the tooling blocks may be adaptable for a variety of shapes and sizes of the engaging structure 12. The tooling block 16 extends adjacent to an attachment member 22 and a portion of the substructure 14 and typically engages at least one reinforcing member 18. The tooling block 16 is typically a metallic or similar material that is capable of enduring the forces generated during friction stir welding, as well as supporting the engaging structure 12 and substructure 14 during welding.

The tooling block 16 should not be limited to that shown in FIGS. 1-3, as the tooling block could be a variety of shapes, sizes, and configurations to engage a variety of engaging structures 12 and substructures 14. For example, in the instance where the reinforcing members 18 are not provided, the tooling block 16 could extend completely between and therefore abut a pair of attachment members 22. Thus, the tooling block 16 may be fabricated for a specific structural assembly 10, and may be used repeatedly for several structural assemblies, or disposed after friction stir welding a unique structural assembly.

The engaging structure 12 and substructure 14 are positioned adjacent to one another to define at least one interface 24 therebetween. A probe 26 is inserted along the interface 24 and through a portion of the engaging structure 12 and substructure 14. Specifically, the probe 26 includes a pin 28 that is urged along the interface 24. As shown in FIGS. 1-3, the pin 28 is typically inserted substantially parallel to the interface 24, although it is understood that "substantially parallel" is not meant to be limiting and could include extending the probe parallel or tilting the probe at a small angle (e.g., 0 to 3 degrees) relative to the engaging structure 12 and substructure 14. The pin 28, which is made of a harder material than either the engaging structure 12 or substructure 14, rotates as it is translated to generate frictional heat within the engaging structure and substructure to at least partially plasticize the engaging structure and substructure. Upon cooling of the plasticized material, the engaging structure 12 and substructure 14 are joined along the resulting butt joint. Friction stir welding is further described in U.S. Pat. No. 5,460,317 to Thomas et al., the entire content of which is incorporated herein by reference.

The probe 26 may also include a bearing 30 at the opposite end of the pin 28. The bearing 30 is attached, or otherwise coupled, to the probe 26 and is positioned adjacent to a tooling block 16 such that the bearing remains stationary while the pin 28 is capable of reciprocating. The tooling block 16 could include a recess or groove to guide the bearing 30 during friction stir welding, or the bearing could simply abut the tooling block. A bobbin tool or similar device may alternatively be coupled to the probe 26 to achieve similar results as that of the bearing 30.

In the instance where the probe 26 is friction stir welding an attachment member 22 to the substructure 14, and the attachment member is medially located between additional attachment members (see for example, the centermost attachment member in FIGS. 1-3), the probe is generally not stiff enough to transfer force to generate a butt joint. Thus, the bearing 30 is positioned adjacent to one tooling block 16, while a second tooling block 16 supports the opposite side of the attachment member 22 that is being friction stir welded to the substructure 14. In order to form a butt joint, the probe 26 is typically a 90-degree probe, which enables the probe to access the interface 24, while the combination of the tooling blocks 16 and bearing 30 enables the probe to generate sufficient force to urge the pin 28 along the interface to form the butt joint. In this regard, the machine urging the probe 26 along the interface is generally perpendicular to the axis of the probe and interface 24. However, the probe 26 may also be aligned with the axis of the machine urging the probe along the interface 24 when there is sufficient space to form a butt joint between the attachment member 22 and substructure 14.

The pin 28 is generally not urged completely along the interface 24, as the pin causes plasticization of the attachment member 22 and substructure 14 beyond the actual depth the pin is urged. However, a shim 32 or similar hard wear material, such as aluminum or titanium may be positioned on, or otherwise attached to, the tooling block 16 such that the pin 28 may fully penetrate along the interface 24 until the pin contacts the shim. Allowing the pin 28 to penetrate entirely along the interface 24 to the shim 32 produces a clean weld by completely plasticizing the attachment member 22 and substructure 14 along the interface. Furthermore, using a material for the shim 32 that is the same as the attachment member 22 and/or substructure 14 promotes a more uniform weld joint in the instance where some of the shim material is pulled into the weld joint.

To produce a butt joint by friction stir welding along the interface 24 between an engaging structure 12 and substructure 14, a tooling block 16 is positioned to engage the reinforcing members 18 and to abut an attachment member 22. The substructure 14 is then positioned adjacent to the attachment member 22 to define the interface 24. The tooling block 16 extends slightly beyond the interface 24 such that the tooling block also abuts a portion of the substructure 14. A probe 26 having a reciprocating pin 28 coupled thereto is urged along the interface 24 in a direction extending into and out of the page with reference to FIGS. 1-3. Therefore, in the embodiment where the engaging structure 12 includes a wing skin, stiffeners, and rib stubs, the rib stubs may be friction stir welded to a rib or spar box along the entire span of the wing skin.

The probe 26 is typically positioned external to the engaging structure 12 when friction stir welding an attachment member 22 located on the end or abut the periphery of the base member 20 such that a bearing 30 is not necessary, although the probe could be positioned internal to the engaging structure if desired. To friction stir weld an attachment member 22 that is located between respective attachment members on the base member 20, a probe 26 having a bearing 30 coupled thereto is positioned adjacent to one tooling block 16, while a second tooling block is positioned adjacent to the interface 24. The probe 26 is advantageously a 90-degree friction stir welding probe that may form a butt weld along the interface 24. A shim 32 may be provided when it is desired to urge the pin 28 entirely along the interface 24 to prevent damaging the tooling block 16 and to create a clean butt joint.

It is understood that the substructure 14 may be positioned adjacent to more than one attachment member 22 to define more than one interface 24 in alternative embodiments of the present invention. Furthermore, multiple probes 26 are capable of being employed simultaneously to form butt joints between the engaging structure 12 and substructure 14 at more than one location. It is also understood that FIGS. 1-3 are illustrative only, and the structural assembly may be oriented in various positions such that the probe 26 travels along the interface 24 in any given direction to form a butt joint between the engaging structure 12 and substructure 14.

Once the structural assembly 10 is created, a predetermined amount of excess material can be machined from the assembly to conform to desired tolerances or configurations. The machining process can be performed by any known means, including using a manual or computer-guided machining device, such as a CNC machine. Shear clips or plug welds, as known to those skilled in the art, may be employed proximate to the interface 24 such that additional reinforcing members may be attached to the structural assembly 10. For example, a rib could be attached to the shear clip and extend between respective attachment members 22 (e.g., rib stubs). Moreover, additional engaging structures 12 and substructures 14 may be added to the structural assembly 10 to expand the structural assembly as desired.

The present invention therefore provides a structural assembly 10 that is capable of being formed into a unitized friction stir welded assembly that significantly reduces the number of fasteners required to join an engaging structure 12 to a substructure 14. As such, the structural assembly 10 reduces the potential for fuel leaks and crack initiation sites. When compared to a lap joint, the butt joint formed between the engaging structure 12 and substructure 14 has an improved surface finish and a lesser chance of developing stress concentrations by trapping moisture.

The tooling blocks 16 employed with the present invention are adaptable for a variety of engaging structures 12 and substructures 14 to resist forces produced during friction stir welding. Moreover, the tooling blocks 16 may be arranged within the engaging structure 12 such that a probe 26 having a 90-degree probe may be used to friction stir weld the butt joint. Thus, the structural assembly 10 enables the probe 26 to form a butt joint between an engaging structure 12 and substructure 14 that would typically be difficult to accomplish, especially in circumstances where the attachment members 22 are located internally within the engaging structure. In addition, when lightweight composite materials are desired, the bonding strips 34 may be embedded in the composite material to facilitate friction stir welding.

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A system for friction stir welding a structural assembly comprising:
    an engaging structure comprising at least one reinforcement member and at least one attachment member extending outwardly therefrom;
    at least one tooling block capable of engaging the at least one reinforcement member and abutting the at least one attachment member;
    a substructure positioned adjacent to the at least one attachment member and tooling block in an abutting configuration to define at least one interface between the substructure and at least one attachment member; and
    a probe operable to friction stir weld the at least one attachment member and substructure member together along the interface.

2. The system according to claim 1, wherein the probe is a 90-degree probe, and wherein the tooling block is capable of supporting the 90-degree probe during friction stir welding.

3. The system according to claim 2, further comprising a bearing coupled to a first end of the 90-degree probe and positioned adjacent to the tooling block, wherein a second end of the 90-degree probe comprises a pin extending proximate to an interface between the at least one attachment member and substructure.

4. A method for friction stir welding a structural assembly comprising:
    positioning at least one tooling block to engage at least one reinforcement member and abut at least one attachment member, each of the at least one reinforcement member and attachment member extending outwardly from an engaging structure;
    positioning a substructure adjacent to the at least one attachment member and tooling block in an abutting configuration to define at least one interface between the substructure and at least one attachment member; and
    urging a probe along the interface to friction stir weld the at least one attachment member and substructure together along the interface.

5. The method according to claim 4, wherein positioning the tooling block comprises positioning the tooling block between a plurality of reinforcing members and the at least one attachment member.

6. The method according to claim 4 further comprising positioning a shim between the tooling block and both the at least one attachment member and substructure.

7. The method according to claim 6, wherein urging comprising urging the probe along the interface between the at least one attachment member and substructure and proximate to the shim such that the probe extends substantially along the interface.

8. The method according to claim 4, wherein urging comprises urging the probe within a bonding strip bonded to at least a portion of the at least one attachment member such that the probe friction stir welds the bonding strip to the substructure along the interface.

9. The method according to claim 4, wherein urging comprises urging the probe within respective bonding strips bonded to at least a portion of the at least one attachment member and substructure such that the probe friction stir welds the respective bonding strips together along the interface.

10. The method according to claim 4, wherein urging comprises urging a 90-degree probe along an interface, and wherein the tooling block is capable of supporting the 90-degree probe during friction stir welding.

11. The method according to claim 4, further comprising positioning a bearing coupled to a first end of the 90-degree probe adjacent to the tooling block, wherein urging comprises urging a second end of the 90-degree probe comprising a pin along an interface between the at least one attachment member and substructure.

12. A method for friction stir welding a structural assembly comprising:
    positioning at least one tooling block to engage an engaging structure;
    positioning a substructure adjacent to the engaging structure and tooling block in an abutting configuration to define at least one interface between the substructure and engaging structure;
    positioning a shim between the tooling block and both the engaging structure and substructure; and
    urging a probe along the interface to friction stir weld the engaging structure and substructure together along the interface.

* * * * *